United States Patent
Baechtle et al.

(10) Patent No.: US 10,834,954 B2
(45) Date of Patent: Nov. 17, 2020

(54) DEVICE AND METHOD FOR FORMING AND DIVIDING OF AT LEAST ONE STRING-SHAPED PASTY FOODSTUFF INTO SLICE-SHAPED PRODUCTS

(71) Applicant: Albert Handtmann Maschinenfabrik GmbH & Co. KG, Biberach (DE)

(72) Inventors: Manfred Baechtle, Schemmerhofen (DE); Siegfried Reutter, Eberhardzell (DE); Claudiu Cret, Bad Saulgau (DE); Daniel Teufel, Schemmerhofen (DE); Achim Werner, Maselheim (DE); Peter Willburger, Baindt (DE); Simon Haid, Moosbeuren (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 15 days.

(21) Appl. No.: 15/694,256

(22) Filed: Sep. 1, 2017

(65) Prior Publication Data
US 2018/0064158 A1 Mar. 8, 2018

(30) Foreign Application Priority Data
Sep. 2, 2016 (EP) ..................................... 16187011

(51) Int. Cl.
*A23P 30/20* (2016.01)
*A21C 11/16* (2006.01)
(Continued)

(52) U.S. Cl.
CPC ................ *A23P 30/20* (2016.08); *A21C 5/00* (2013.01); *A21C 11/16* (2013.01); *A23L 13/00* (2016.08);
(Continued)

(58) Field of Classification Search
CPC . A23L 13/00; A21C 5/00; A21C 11/16; A23P 30/20; B26D 1/006; B26D 1/04
See application file for complete search history.

(56) References Cited

U.S. PATENT DOCUMENTS 4,734,024 A * 3/1988 Tashiro ................ A21C 11/103
425/132
4,767,304 A * 8/1988 Tashiro ................ A21C 11/103
264/148
(Continued)

FOREIGN PATENT DOCUMENTS

AU 2014202070 A1 10/2014
EP 0466519 A1 1/1992
(Continued)

*Primary Examiner* — Steven N Leff
(74) *Attorney, Agent, or Firm* — McCoy Russell LLP

(57) ABSTRACT

Device for forming and dividing of at least one string-shaped pasty foodstuff into slice-shaped products, with a forming nozzle for extruding the string-shaped foodstuff along a conveying direction through a nozzle opening, which determines the thickness of the slice-shaped product, at least one forming plate that is arranged downstream of the forming nozzle and that can be displaced during extrusion with at least one positioning element in at least one component transversally to the conveying direction, and with a control unit that controls the positioning element synchronously to the extrusion velocity in a way that the at least one forming plate forms a longitudinal contour of the slice-shaped product variably during extrusion.

17 Claims, 5 Drawing Sheets

(51) Int. Cl.
*A21C 5/00* (2006.01)
*A23L 13/00* (2016.01)
*A23L 19/12* (2016.01)
*B26D 1/00* (2006.01)
*B26D 1/04* (2006.01)

(52) U.S. Cl.
CPC ............ *A23L 19/12* (2016.08); *B26D 1/0006* (2013.01); *B26D 1/04* (2013.01); *A23V 2002/00* (2013.01); *B26D 2001/006* (2013.01); *B26D 2001/0066* (2013.01); *B26D 2210/02* (2013.01)

(56) References Cited

U.S. PATENT DOCUMENTS

| | | | | |
|---|---|---|---|---|
| 4,882,185 A * | 11/1989 | Simelunas | ............... | A21C 5/00 426/283 |
| 5,643,617 A | 7/1997 | Burtscher | | |
| 5,820,890 A * | 10/1998 | Kobayashi | ........... | A21C 11/103 425/133.1 |
| 5,916,601 A * | 6/1999 | Onoguchi | ............. | A21C 11/00 425/132 |
| 6,303,168 B1 * | 10/2001 | Campbell | ................ | A21C 5/00 425/239 |
| 6,892,630 B1 * | 5/2005 | Huang | ................. | A21C 11/103 425/308 |
| 8,827,683 B2 * | 9/2014 | Kobayashi | ........... | A21C 11/163 425/287 |
| 2010/0143560 A1 * | 6/2010 | Burmester | ............. | A23G 9/285 426/516 |
| 2010/0209580 A1 * | 8/2010 | Unlu | .................... | A21C 11/103 426/516 |
| 2012/0171337 A1 * | 7/2012 | Campbell | ................ | A21C 5/00 426/231 |

FOREIGN PATENT DOCUMENTS

| | | |
|---|---|---|
| EP | 1447006 A1 | 8/2004 |
| EP | 1576883 A1 | 9/2005 |
| EP | 2789239 A1 | 10/2014 |
| JP | H0322674 U | 3/1991 |
| JP | 2002306054 A | 10/2002 |

* cited by examiner

DEVICE AND METHOD FOR FORMING AND DIVIDING OF AT LEAST ONE STRING-SHAPED PASTY FOODSTUFF INTO SLICE-SHAPED PRODUCTS

CROSS-REFERENCE TO RELATED APPLICATIONS

The present application claims priority to European Patent Application No. 16 187 011.8, entitled "DEVICE AND METHOD FOR FORMING AND DIVIDING OF AT LEAST ONE STRING-SHAPED PASTY FOODSTUFF INTO SLICE-SHAPED PRODUCTS," filed on Sep. 2, 2016, the entire contents of which are hereby incorporated by reference for all purposes.

TECHNICAL FIELD

The present disclosure relates to a device and a method for forming and dividing of at least one string-shaped pasty foodstuff into slice-shaped products.

BACKGROUND AND SUMMARY

Usually, a string-shaped foodstuff is extruded by a format part and hence the desired profile contour is determined for manufacturing of slice-shaped products such as hamburgers or semolina slices. The profile contour in a hamburger usually has a circular slice shape and a rhomboid shape in case a semolina slice, but other random forms are also conceivable. The string-shaped foodstuff is pressed through the format part in accordance with the desired product thickness, separated by means of form plates or a knife and deposited on a conveyor belt or the like as a slice-shaped product. Subsequently, the slice-shaped products are further processed in further production steps, for example in a packaging station.

The EP 1 576 883 A1 discloses a device for foodstuff production in which the pasty mass is distributed over four feed lines, which are each equipped with a nozzle with a profile cross-section that has the shape of a circular slice for forming a string-shaped foodstuff, by means of a conveyor pump and a distributor. Two forming plates that are disposed downstream and that can be moved against one another respectively have four circular openings that correspond with the nozzles in order to shear off the string-shaped foodstuff in accordance with the desired thickness of the slice-shaped product.

Furthermore, the EP 1 447 006 A1 discloses a portioning device for food products in which the pasty mass is filled into a forming chamber that corresponds to the desired profile contour of the slice-shaped product in the cross-section. A cutting device has a cutting knife that is inserted into the forming chamber for portioning where it cuts the pasty mass in accordance with the product thickness.

In the known devices and methods, it is disadvantageous that the forming plates and/or cutting knives have to be guided along the profile contour with the largest product diameter during the separation process. Therefore, it might occur occasionally that the slice-shaped product is not only cut but also squeezed due to the transversal force, which can lead to undesired changes of the product form or to a smeared product surface.

Furthermore, it is disadvantageous in this context that the format parts of the nozzle have to be replaced in case of changeover to a product with a different profile contour.

The purpose of the present disclosure therefore is to provide a device and a method for forming and dividing of at least one string-shaped pasty foodstuff into slice-shaped products that enable improved shaping of the slice-shaped product and that can be used more flexibly.

To solve this problem, the present disclosure provides a device for forming and dividing of at least one string-shaped pasty foodstuff into slice-shaped products.

According to the present disclosure, a forming nozzle for extruding the string-shaped foodstuff, which determines the thickness of the slice-shaped product by means of a nozzle opening, is provided. Consequently, the thickness is determined by the forming nozzle itself and no longer by means of separation. Therefore, the string-shaped foodstuff does no longer have to be separated along the profile contour with the largest product diameter of the slice-shaped product. Furthermore, it is provided according to the present disclosure that at least one forming plate, which can be displaced transversally to the conveying direction during extrusion with at least one positioning element in at least one component, is arranged downstream of the forming nozzle. Furthermore, the at least one positioning element is controlled by means of a control unit in a way that the longitudinal contour of the slice-shaped product is formed variably during extrusion. Therefore, the desired longitudinal contour of the slice-shaped product, which forms the profile contour, is shaped. As a consequence, the profile contour is not created variably by means of the forming nozzle but by means of the forming plate. This enables a particularly low stress of the slice-shaped product in the transversal direction and hence a high geometrical stability. In addition, the at least one forming plate can be controlled in any way, wherein a change of the profile contour through simple modification of the activation mechanism of the positioning element is possible. Therefore, the device can be used particularly flexibly.

The device can comprise a conveyor system for conveying the string-shaped foodstuff through the forming nozzle. The device can have a funnel in order to absorb a pasty food mass and to feed said food mass to the conveyor system. It is possible for the device to be formed in a way that it can be coupled with a wagon, which is liftable by means of an appropriate lifting device, for the food mass or the like in order to pour the pasty food mass into the funnel.

The pasty food mass can comprise sausage meat, a potato mixture, a semolina mixture, a meat mass or the like. It is conceivable for the slice-shaped products to be hamburgers, semolina slices or the like.

"Slice-shaped product" can mean in this context that the maximum diameter of the profile contour is larger than the thickness, in at least one example by at least the factor 2, and in further examples by at least the factor 4. It is also possible that the square root of the area of the profile contour is larger than the thickness, in at least one example by at least the factor 2, and in further examples by at least the factor 4. "Profile contour" can mean in this context that the contour is the cross-section area of the product.

The conveyor system can comprise at least one auger in order to convey the pasty food mass to the forming nozzle. A drive can be provided for rotating the auger. It is conceivable for two augers to mesh with one another in order to convey the pasty food mass. Any type of conveyor system that is suitable to convey pasty masses or and/or the pasty string-shaped foodstuff can be used here. The conveyor system can comprise for example a wing conveyor system, an auger conveyor system or rather a container that is under pressure. A distributor can be arranged downstream of the conveyor system in order to distribute the pasty food mass over multiple forming channels in the forming nozzle.

The forming nozzle can be provided for forming the string-shaped foodstuff out of the pasty food mass. Extruding can mean in this context that the pasty food mass is pressed through the nozzle opening in order to form the string-shaped foodstuff. The nozzle opening can have an essentially rectangular contour whose height corresponds to the thickness of the slice-shaped product and whose width corresponds to at least the maximum diameter of the slice-shaped product. In other words, the nozzle opening can comprise a slit- or gap-shaped opening in order to extrude the string-shaped foodstuff. It is also conceivable for the forming nozzle to have multiple forming channels by means of which multiple string-shaped foodstuffs can be formed in parallel.

"Forming plate" can mean in this context an element that can be used to form the longitudinal contour of the slice-shaped products. The forming plate can have a forming edge by means of which the longitudinal contour of the slice-shaped product can be formed. It is conceivable that two forming plates are arranged opposite to one another on the forming nozzle in order to variably form two sides of the slice-shaped product. The forming edge can for example be formed in a blade-like way in order to cast off a part of the string-shaped foodstuff. Likewise, the forming plate can be formed to separate the string-shaped foodstuff. The forming plate can be disposed laterally on the nozzle opening after the forming nozzle. The forming plates can be displaceable transversally or obliquely to the direction of the thickness of the slice-shaped product. In other words, the forming plate can be arranged on the forming nozzle in a way that it forms a product side that is positioned transversally in relation to the thickness expansion, wherein the thickness of the slice-shaped product remains unaffected.

The positioning elements can be connected to the forming plates via connecting elements, drives, lever elements or also in a rigid way. The positioning elements can each comprise a step engine, a linear drive or a servo engine. The forming plate can be displaceable with the positioning element, essentially transversally to a conveying direction of the string-shaped foodstuff during extrusion.

Here, the indication that the control unit "controls the positioning element synchronously to the extrusion velocity" can mean that the at least one positioning element is displaced in correspondence with a velocity of the extrusion of the string-shaped foodstuff through the nozzle opening, a conveying movement of the string-shaped foodstuff and/or a conveying velocity of the conveyor system. Likewise, the extrusion velocity can be a velocity at which the string-shaped foodstuff leaves the nozzle opening. For example, the extrusion velocity of the string-shaped foodstuff can be controlled or recorded during extrusion in order to control the positioning elements synchronously to the extrusion velocity. For example, the string-shaped foodstuff can be extruded at a constant velocity, wherein the positioning element displaces the forming plate at a constant velocity in order to create an oblique longitudinal contour. The longitudinal contour is formed due to the combination of the conveying movement of the string-shaped foodstuff and the displacing movement of the forming plate.

The longitudinal contour can form the profile contour of the slice-shaped product at least partially. Here, "longitudinal contour" can mean the contour of the slice-shaped product along the conveying direction. The longitudinal contour can be stored as control data in the control unit, for example by means of an input unit, a data connection or the like.

Two or more of the forming plates can each be connected to one of the positioning elements, wherein the positioning elements are formed in a way that they can be activated separately with the control unit in order to variably form appropriate different longitudinal contours of the slice-shaped product. It is also conceivable that only one forming plate is connected to a positioning element in order to form a one-sided longitudinal contour of the slice-shaped product. In this, the longitudinal contour that is located respectively opposite can be formed with the forming nozzle or with a rigidly disposed forming plate. Therefore, the slice-shaped product can be deformed from multiple sides, which allows for a more flexible product design. It is also conceivable that a positioning element, which can be activated by means of the control unit, is available for each forming plate. For example, there can be exactly two forming plates that are disposed opposite to one another on the forming nozzle. Therefore, longitudinal contours of the slice-shaped product, which are located respectively opposite to one another, can be formed simultaneously. However, it is also possible that only one forming plate forms the longitudinal contour from one side.

The conveyor system and/or the forming nozzle can be formed for extrusion of several string-shaped foodstuffs in parallel lanes, wherein the at least one forming plate has forming edges that correspond with said conveyor system and/or forming nozzle in order to form longitudinal contours of multiple slice-shaped products that correspond to one another variably and simultaneously. Therefore, the throughput of the device can be increased. For example, the conveyor system can comprise the aforementioned distributor and the forming nozzle of multiple forming channels. The forming channels can have an offset transversally to the movement direction of the forming plates. Due to this, the nozzle openings can be put together more closely without there being a mutual influence among the forming edges of the forming plates for different nozzle openings. A forming plate can have two or even more openings for the string-like foodstuffs with at least one forming edge that form longitudinal contours that correspond to one another. For example, two forming plates with respectively two or even more openings can be disposed successively, wherein one opening in one forming plate interacts with another opening of the other forming plate in order to form longitudinal contours, which are located opposite to one another, of one of the slice-shaped products.

Two of the forming plates can be displaceable with one or multiple positioning elements correspondingly or independently of one another and in a way as to counteract with one another in order to variably form longitudinal contours of the slice-shaped product, which are located opposite to one another, with two forming edges. Therefore, a slice-shaped product can be formed particularly variably from both sides with any contours.

Two or multiple ones of the forming plates can be disposed in the conveying direction in the same plane or in a row. For example, two forming plates can be arranged in the same plane and counteract one another in order to separate the string-shaped foodstuff. It is also conceivable that two forming plates are arranged successively and have at least two openings that correspond with one another, wherein one opening in one of the forming plates is formed to form a first longitudinal contour of the slice-shaped product, and wherein the other opening in the other forming plate is designed to form a second longitudinal contour that is located opposite to the first longitudinal contour. In some examples, two forming plates that are arranged successively can be formed to shear off the string-shaped foodstuff.

The at least one positioning element can comprise a position sensor that is connected to the control unit in order to record and to control a setting position of the at least one forming plate. Therefore, the longitudinal contour can be formed even more accurately. It is conceivable that the position sensor is an encoder. The position sensor can be disposed on a drive axis of the positioning element in at least one example.

The control unit can be formed to displace the at least one positioning element as a function of a conveying movement of the string-shaped foodstuff. Therefore, swelling of the food mass during extrusion can be taken into account and the longitudinal contour can be formed more accurately. It is possible that the conveying movement of the string-shaped foodstuff is recorded via a conveyor or drive velocity of the conveyor system.

It is also possible that the control unit is formed in a way as to control a conveying velocity of the conveyor system in order to convey the string-shaped foodstuff with a variable conveyor movement through the forming nozzle. Therefore, the conveying movement can be adapted to the flowing behavior of the string-shaped foodstuff, which leads to a further improvement of the shaping process. For example, the string-shaped foodstuff can, in case of a mostly open position of the forming plates, be conveyed particularly fast, and conveyed respectively slowly or be stopped completely in case of an almost closed or closed position of the forming plates. The positioning elements can in this case be controlled particularly accurately and in accordance with the conveying velocity of the conveyor system.

In some examples an upper or lower forming surface of the nozzle opening can be formed in an adjustable way in order to set the thickness of the slice-shaped product. Therefore it is possible to adapt the device easily to the desired thickness of the slice-shaped product. The forming surface can be height-adjustable with a mechanical positioning mechanism. On top and/or at the bottom can mean vertically on top and/or at the bottom in this context. Here, vertical can be the direction that is oriented towards the center of the Earth.

In addition, the present disclosure provides a method for forming and dividing of at least one string-shaped pasty foodstuff into slice-shaped products.

According to the present disclosure, the string-shaped foodstuff is extruded through the nozzle opening of the forming nozzle, wherein the thickness of the slice-shaped product is determined by means of the nozzle opening. Consequently, the thickness is no longer determined by the separation process, but by the forming nozzle itself. Therefore, the string-shaped foodstuff does no longer have to be separated along the profile contour with the maximum product diameter of the slice-shaped product. It is further provided according to the present disclosure that at least one forming plate, which is disposed downstream of the forming nozzle, is displaced transversally to the conveying direction during extrusion with at least one positioning element in at least one component. Furthermore, the at least one positioning element is controlled with a control unit and synchronously to the extrusion velocity in a way that the longitudinal contour of the slice-shaped product is formed variably during the extrusion process. Therefore, the desired longitudinal contour of the slice-shaped product, which forms the profile contour, is formed by means of the forming plates. As a consequence, the profile contour is not created with the forming nozzle but variably by means of the forming plates. This allows for a particularly low stress of the slice-shaped product in a transversal direction and hence a high dimensional stability. In addition, the forming plates can be activated in any way, whereby a change of the profile contour is caused by a simple change of the activation of the positioning element. Therefore, the device can be used particularly flexibly.

The method can be performed with the device for forming and dividing of at least one string-shaped pasty foodstuff into slice-shaped products described before. Besides, the method can comprise the features, which were described before with reference to the device, individually or in any combinations.

The string-shaped foodstuff can be conveyed through the forming nozzle by means of a conveyor system. The conveyor system can convey the string-shaped pasty foodstuff by means of wings, an auger or excess pressure.

In at least one example, the control unit can displace the at least one positioning element as a function of a conveying movement of the string-shaped foodstuff. Therefore, the string-shaped foodstuff can be conveyed with a variable conveying movement in order to integrate the flowing behavior of the pasty food mass.

Furthermore, the control unit can control a conveying velocity of the conveyor system variably in order to convey the string-shaped foodstuff with a variable conveying movement through the forming nozzle. Hence, the conveying movement can be synchronized particularly easily with the displacing movement of the positioning elements.

BRIEF DESCRIPTION OF THE FIGURES

Further features and advantages of the present disclosure will be explained in greater detail in the following and based on the embodiments shown in the Figures. The Figures show.

DETAILED DESCRIPTION

Figure 1:
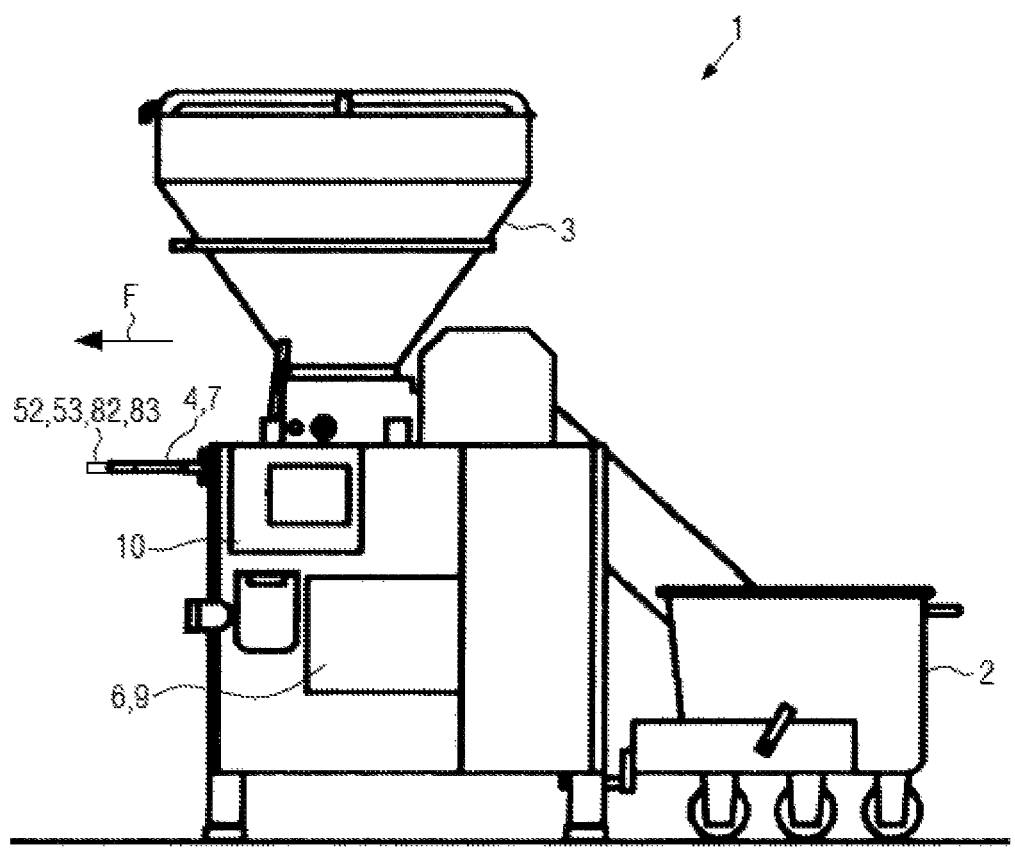
FIG. 1 shows an overview display of an embodiment of a device for forming and dividing of at least one string-shaped pasty foodstuff into slice-shaped products in a lateral view.

FIG. 1 shows an overview of an embodiment of a device 1 for forming and dividing of at least one string-shaped pasty foodstuff into slice-shaped products in a lateral view. It shows that the wagon 2, by means of which a pasty food mass can be lifted by an appropriate lifting device and poured into the funnel 3, is coupled to the device 1. Below the funnel 3 there is a conveyor system 10, which is not displayed here in greater detail and by means of which the mass is conveyed through the forming nozzle 4, 7 during operation and extruded as a string-shaped foodstuff. It is conceivable that the conveyor system 10 comprises a wing conveyor system or an auger conveyor system. Alternatively, the conveyor system can comprise a container under pressure in order to convey the mass.

The forming nozzle 4, 7 is formed with a nozzle opening for extruding the string-shaped foodstuff along the conveying direction F that determines the thickness of the slice-shaped product. Furthermore, it can be seen that the forming plates 52, 53, 82, 83, which can be displaced during extrusion by means of respectively one positioning element in at least one component transversally to the conveying direction F, are arranged downstream of the forming nozzle 4, 7.

In addition, the control unit 6, 9 is shown, which controls the positioning elements synchronously to the conveyor system 10 in a way that the forming plates 52, 53, 82, 83 form the longitudinal contour of the slice-shaped product variably during extrusion.

Figure 2A:
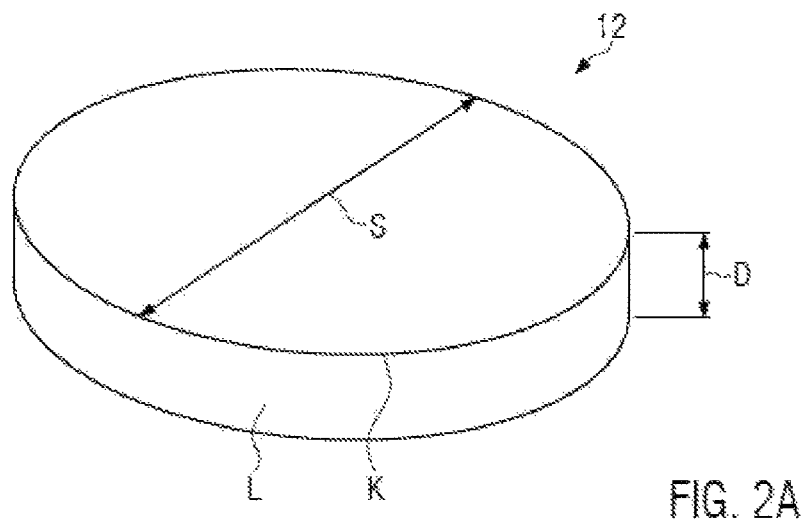
FIGS. 2A-2B show a display of two slice-shaped products in a perspective view.
Figure 2B:
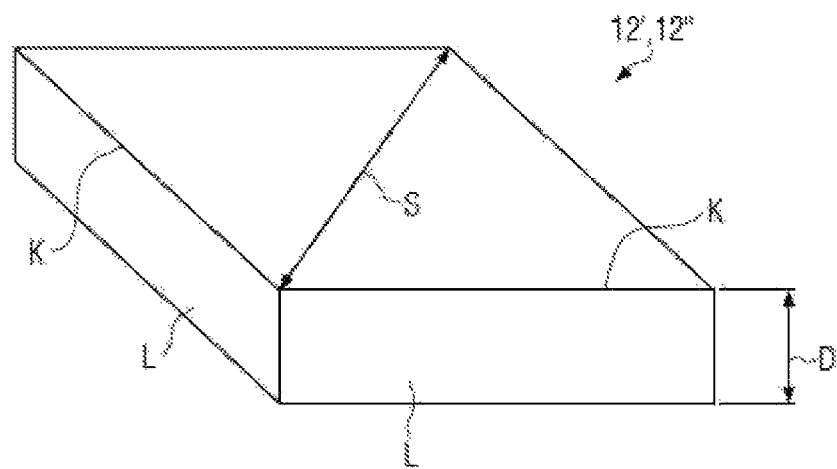

The slice-shaped product 12, 12', 12" is described in greater detail based on the following FIGS. 2A-2B. Further, the forming nozzles 4 and/or 7 and the forming plates 53, 53 and/or 82, 83 arranged downstream will be described in greater detail in the following and based on the FIGS. 3A-3B and/or 4A-4B.

FIG. 2A displays a first circular slice-shaped product 12 in greater detail in a perspective view. It is a hamburger patty with the thickness D that has an essentially circular slice-shaped profile contour K with the diameter S. It also shows that the thickness D is significantly smaller than the diameter S and/or the square root of the area of the profile contour K. Moreover, it can be seen that the profile contour K is formed on the sides of the slice-shaped product 12 through the circular longitudinal contour L that is formed with the forming plates 52, 53, 82, 84 of the device 1 of FIG. 1.

FIG. 2B shows a second slice-shaped product 12', 12" in greater detail in a perspective view. It displays that the product is a semolina slice with the thickness D in this case. The profile contour K essentially has a rhomboid shape with a maximum diameter S. It can also be seen here that the thickness D is significantly smaller than the maximum diameter S and/or the square root of the area of the profile contour K. In addition, the sides of the profile contour K are respectively formed by two essentially straight longitudinal contours L that are bent towards one another.

Figure 3A:
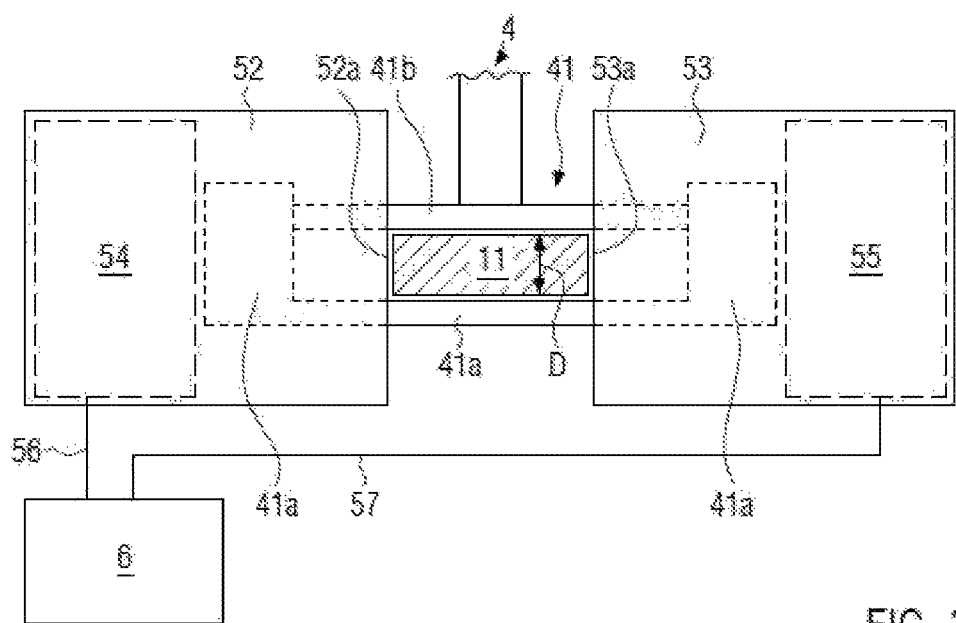
FIGS. 3A-3B show an embodiment of a forming nozzle and two forming plates that are arranged downstream in a front and top view.
Figure 3B:
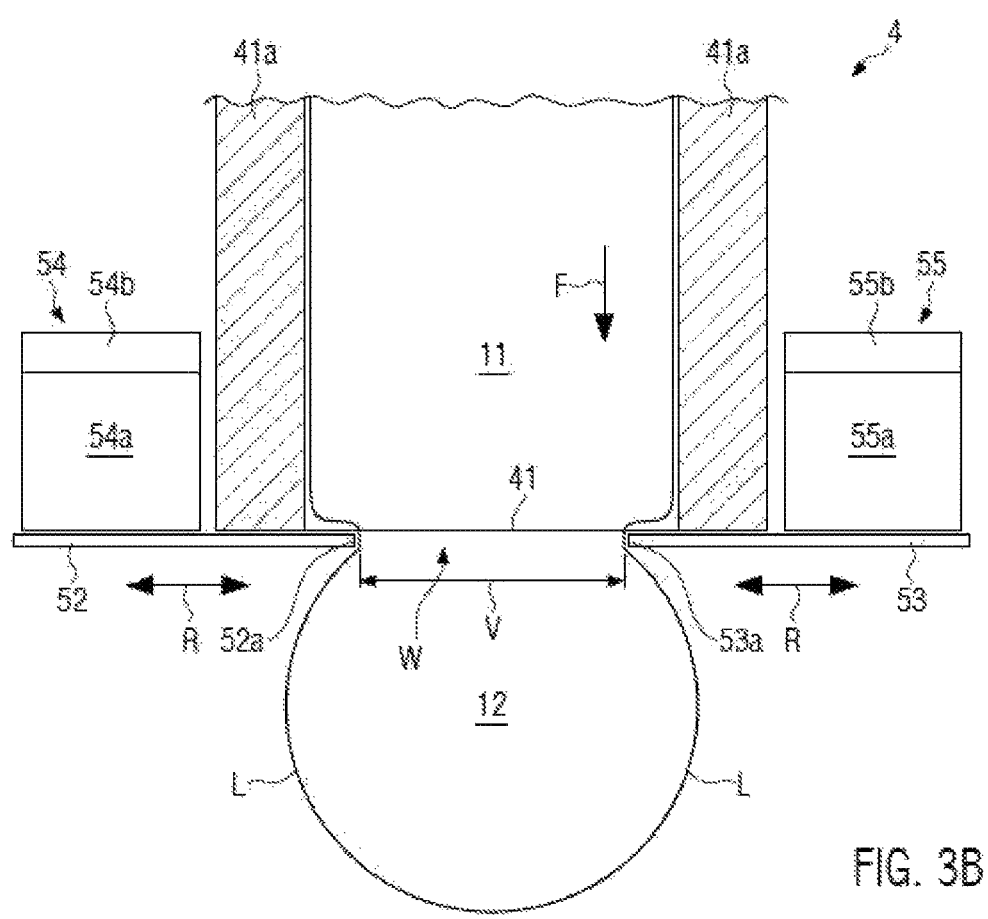

FIG. 3A-3B shows an embodiment of a forming nozzle 4 and two forming plates 52, 53 arranged downstream in a front and a top view. It displays the forming nozzle 4 for extrusion of the string-shaped foodstuff 11 along the conveying direction F. The forming nozzle 4 is formed by an essentially U-shaped forming channel 41a into which the upper forming surface 41b is inserted in a punched way. Therefore, the nozzle opening 41 is formed with essentially straight upper and lower sides. The thickness D of the slice-shaped product 12 is determined by the floor area of the U-shaped forming channel 41a and the upper forming surface 41b.

The conveyor system 10 described before with reference to FIG. 1 is used to press the pasty food mass through the nozzle opening 41 and to extrude the string-shaped foodstuff 11 in this way.

Moreover, it is shown that the two forming plates 52, 53 are arranged downstream of the forming nozzle 4 and that they form a window W of the variable width V with their forming edges 52a, 53a. The forming plates 52, 53 are each connected to a positioning element 54, 55 by means of which they can displaced in the direction R transversally to the conveying direction F. Hence, the two forming plates 52, 53 can be displaced by means of the two positioning elements 54, 55 in a way as to have a counteracting effect in order to form the opposite longitudinal contours L of the slice-shaped product 12 variably with the two forming edges 52a, 53a.

Furthermore, the control unit 6 is connected to the positioning elements 54, 55 via the lines 56, 57 in order to transmit control signals or engine currents. The control unit 6 controls the positioning elements 54, 55 synchronously to the conveyor system 10 in a way that the two forming plates 52, 53 are displaced synchronously with the conveying movement of the string-shaped foodstuff 11 during extrusion and therefore form the longitudinal contour L of the slice-shaped product 12. In other words, the forming plates 52, 53 are controlled as a function of the conveying movement of the string-shaped foodstuff 11 extruded through the forming nozzle 4 in a way that the longitudinal contour L of the slice-shaped product 12 is covered by the driving movement.

Furthermore, the control unit 6 is connected to the conveyor system 10 displayed in FIG. 1 and controls the conveying velocity of said conveyor system in order to convey the string-shaped foodstuff 11 with a variable conveying movement through the forming nozzle 4. Therefore, it is for example possible to reduce the conveying velocity or to stop the conveyor system 10 completely when the slice-shaped product 12 is separated from the remaining string-shaped foodstuff 11.

Moreover, it can be seen that the positioning elements 54, 55 each comprise a drive 54a, 55a and a position sensor 54b, 55b connected to said drive. The position sensors 54b, 55b record the rotation and location positions of the respective drives 54a, 55a and report them back to the control unit 6. Consequently, the exact setting positions of the forming plates 52, 53 can be recorded and controlled. An even more accurate shaping of the slice-shaped product 12 is therefore possible.

Likewise, it is possible to move the forming plates 52, 53 with the positioning elements 54, 55 independently of one another. Therefore, also slice-shaped products that are asymmetric to the conveying direction F can be produced.

Figure 4A:
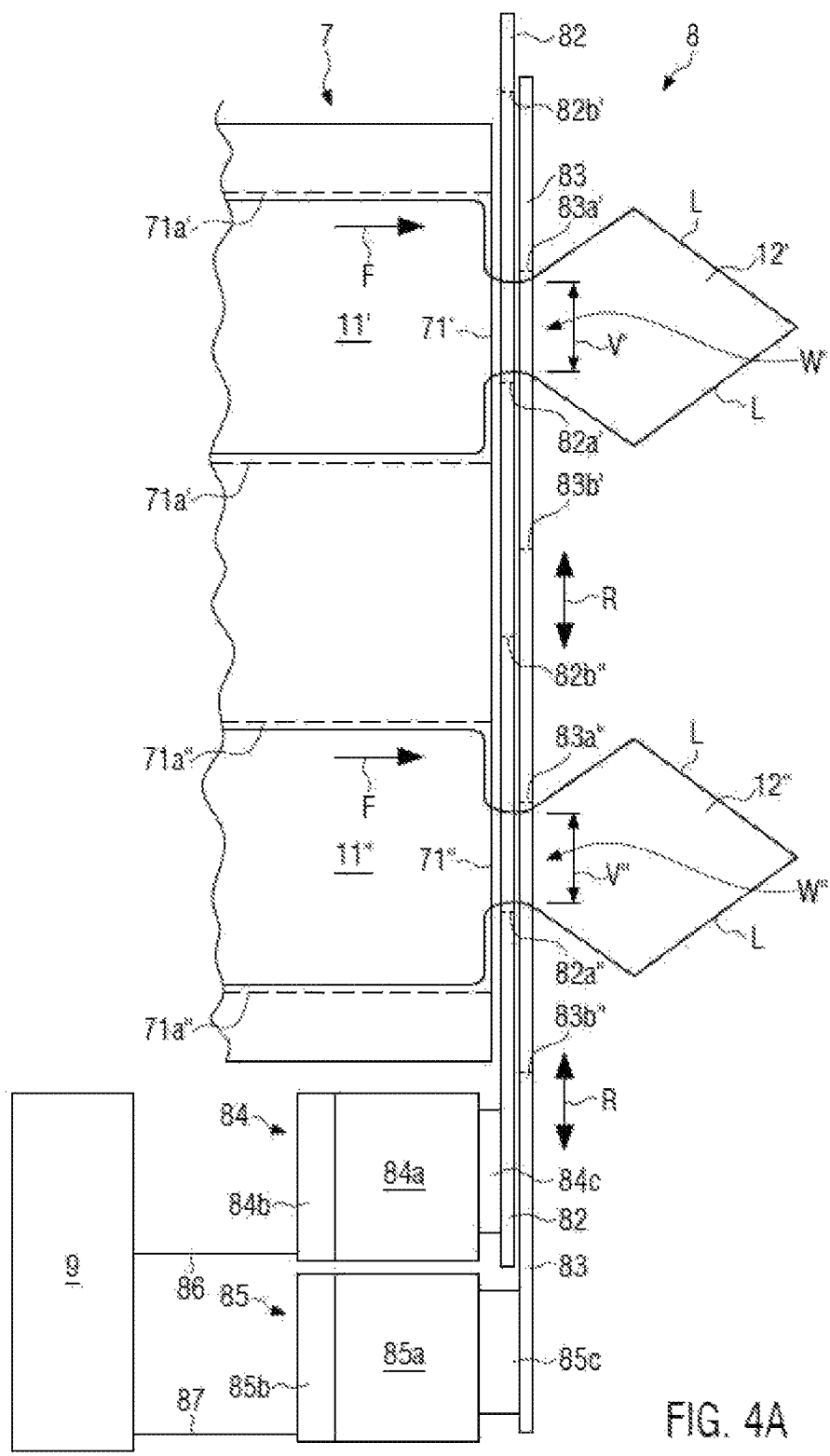
FIGS. 4A-4B show a further embodiment of a forming nozzle for extruding multiple string-shaped foodstuffs and two downstream forming plates in a front and a top view.
Figure 4B:
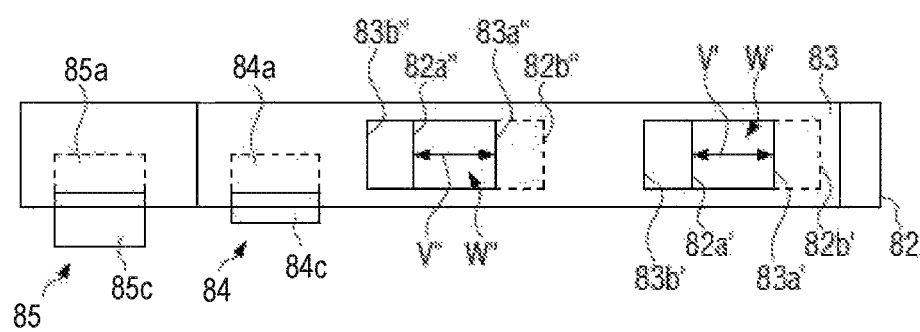

FIGS. 4A-4B show a further alternative embodiment of a forming nozzle 7 for extruding multiple string-shaped foodstuffs 11', 11" and two forming plates 82, 83 arranged downstream of said string-shaped foodstuffs in a front and a top view. The embodiment differs from the one in FIG. 3A-3B essentially in that multiple string-shaped foodstuffs 11', 11" are formed simultaneously and divided into the slice-shaped products 12', 12".

It is shown that the forming nozzle 7 is formed with two forming channels 71a', 71a" that form the nozzle openings 71', 71" at the end. Said openings can either be formed in a rigid way or form the upper or lower forming surfaces according to FIG. 3A with two U-shaped channels and hence interacting punches. In addition, the conveyor system 10 of FIG. 1 is in this case equipped with a distributor that distributes the pasty food mass in an equal way over the channels 71a', 71a". Therefore, the conveyor system 10 and the forming nozzle 7 for extruding the two string-shaped foodstuffs 11', 11" is formed in parallel lanes.

Furthermore, it can be seen that the forming plates 82, 83 have forming edges 82a', 83a', 82a", 83a" that correspond with the channels 71a', 71a" and that form the openings W', W" with the variable widths V', V". For this purpose, the forming plates 82, 83 are equipped with two essentially rectangular recesses whose edges form the forming edges 82a', 82a", 83a', 83a". The recesses are so large that the respective edges 82b', 82b", 83b', 83b" located opposite do not touch the string-shaped foodstuffs 11', 11". The forming channels 71a', 71a" can have an offset that is transversal to the movement direction of the forming plates 82, 83 (i.e. upwards or downwards in FIG. 4B). Therefore, the nozzle openings 71', 71" and/or the openings W', W" can be moved together more closely so that the forming edges 82a', 82a", 83a', 83a" do not influence one another.

The forming plates 82, 83 are connected to the two positioning elements 84, 85 via the connecting elements 84c, 85c and arranged in a row in the conveying direction F. Therefore, the recesses can be displaced against one another in the forming plates 82, 83 so that the two openings W', W" with the variable widths V', V" can be formed and modified. Therefore, the two string-shaped foodstuffs 11', 11" can be formed simultaneously after the forming nozzle 7 and transversally to the conveying direction and hence the longitudinal contours L of the two slice-shaped products 12', 12" can be formed this way.

For this purpose, the control unit 9 is connected to the positioning elements 84, 85 via the lines 86, 87. The control unit 9 controls the positioning elements 84, 85 synchronously to the conveyor system 10 in a way that the two forming plates 82, 83 form the longitudinal contours L of the slice-shaped products 12', 12" during extrusion. In other words, the forming plates 82, 83 are controlled as a function of the conveying movement of the string-shaped foodstuffs 12', 12" extruded through the forming nozzle 7 in a way that the longitudinal contours L of the slice-shaped products 12', 12" are covered by the movement at the same time. Hence, a higher throughput is possible in relation to the embodiment displayed in FIGS. 3A-3B.

It can further be seen that the positioning elements 84, 85 each comprise a drive 84a, 85a and a position sensor 84b, 85b connected to said drive. With the position sensors 84b, 85b, the rotary positions of the respective drives 84a, 85a are recorded and reported back to the control unit 9. As a consequence, the exact setting positions of the forming plates 82, 83 can be recorded and controlled. Therefore, an even more accurate shaping of the slice-shaped products 12', 12" is possible.

The device 1 of FIG. 1 is used in a way that it interacts with the forming nozzle 4 and the forming plates 52, 53 of FIGS. 3A-3B and/or of the forming nozzle 7 and the forming plates 82, 83 as follows:

At first, the pasty mass is filled into the wagon 2 and poured into the funnel 3 by means of a lifting device. Then, the string-shaped foodstuff 11, 11', 11" is conveyed by means of the conveyor system 10 through the forming nozzle 4, 7 and extruded through the nozzle opening 41, 71', 71" along the conveying direction F. Therefore, the thickness D of the slice-shaped product 12, 12', 12" is determined. The two forming plates 52, 53, 82, 83 that are disposed downstream of the forming nozzle 4, 7 are displaced during extrusion with the two positioning elements 54, 55, 84, 85 transversally to the conveying direction F, wherein the control unit 6 controls the positioning elements 54, 55 synchronously to the conveyor system 10 in a way that the two forming plates 52, 53, 82, 83 form the longitudinal contour L of the slice-shaped product 12, 12', 12" variably during extrusion. In this process, the positioning elements 54, 55, 84, 85 are displaced with the control unit 6 as a function of the conveying movement of the string-shaped foodstuff 11, 11', 11" and the conveyor system 10 is controlled accordingly so that the slice-shaped product 12, 12', 12" is formed.

Due to the condition that the thickness D of the slice-shaped products 12, 12', 12" is determined with the forming nozzles 4, 7, the string-shaped foodstuff 11, 11', 11" no longer has to be separated along the desired profile contour K with the maximum diameter S of the slice-shaped products 12, 12', 12". Besides, the longitudinal contour L of the slice-shaped products 12, 12', 12" is formed by means of displacing the forming plates 52, 53, 82, 83 with the positioning elements 54, 55, 84, 85. Therefore, the slice-shaped products 12, 12', 12" only have to bear a particularly low stress in the transversal direction and hence have a particularly low form deviation. In addition, the disclosed device can be used particularly flexibly due to the use of the forming plates 52, 53, 82, 83 that can be displaced by means of the positioning elements 54, 55, 84, 85 as the desired profile contour K can be formed flexibly through an appropriate modification in the control data.

It is clear that features mentioned in the previously described embodiments are not limited to these combinations but are also possible individually or in any other combinations.

The invention claimed is:

1. A method, comprising:
forming and dividing of at least one string-shaped foodstuff into slice-shaped products, wherein the at least one string-shaped foodstuff is foodstuff extruded along an axial-length through a nozzle opening of a forming nozzle along a conveying direction, wherein the nozzle opening determines a thickness of the slice-shaped products, wherein the forming nozzle is formed by a U-shaped forming channel having a U-shaped cross section perpendicular to the conveying direction, wherein an upper forming surface is inserted into the U-shaped forming channel in a punched way perpendicular to the conveying direction, wherein the thickness of the slice-shaped products is determined by two parallel sides of the nozzle opening, wherein at least one forming plate that is disposed downstream of the forming nozzle in the conveying direction is displaced transversally to the conveying direction during extrusion with at least one positioning element in at least one component, wherein a control unit controls the positioning element synchronously with an extrusion velocity, the at least one forming plate downstream of the forming nozzle variably forming a longitudinal contour of the slice-shaped products during extrusion, wherein the at least one forming plate forms a product side that is positioned transversally in relation to the thickness of the slice-shaped products determined by the nozzle opening, and wherein the thickness of the slice-shaped products remains unaffected by the at least one forming plate.

2. The method according to claim 1, wherein the control unit displaces the at least one positioning element as a function of a conveying movement of the at least one string-shaped foodstuff.

3. The method according to claim 1, wherein the control unit variably controls a conveying velocity of a conveyor system in order to convey the at least one string-shaped foodstuff with a variable conveying movement through the forming nozzle.

4. The method according to claim 1, wherein the at least one forming plate is two or more forming plates, wherein the two or more forming plates are displaced transversally to the conveying direction during extrusion with two or more respective positioning elements, wherein the positioning elements are activated separately with the control unit in order to form respectively different longitudinal contours of the slice-shaped products variably.

5. The method according to claim 1, wherein the forming nozzle forms at least two string-shaped foodstuffs in parallel lanes, and wherein the at least one forming plate forms longitudinal contours of the slice-shaped products with forming edges that correspond to said parallel lanes.

6. The method according to claim 1, wherein two of the forming plates are displaced with one or multiple positioning elements correspondingly or independently of one another and in a way as to counteract with one another variably forming longitudinal contours of the slice-shaped products, which are located opposite to one another, with two forming edges.

7. The method according to claim 1, wherein the at least one positioning element comprises a position sensor that is connected to the control unit, and wherein a setting position of the at least one forming plate is recorded and controlled with the position sensor.

8. The method according to claim 1, wherein at least one of the two parallel sides of the nozzle opening is adjusted in order to set the thickness of the slice-shaped products, and wherein a floor surface of the U-shaped forming channel and the U-shaped cross section are planar.

9. A method, comprising:
forming and dividing of at least one string-shaped foodstuff into slice-shaped products, wherein the at least one string-shaped foodstuff is foodstuff extruded along an axial-length through a nozzle opening of a forming nozzle along a conveying direction, wherein the forming nozzle is formed by a U-shaped forming channel having a U-shaped cross section perpendicular to the conveying direction into which an upper forming surface is inserted in a punched way, wherein a thickness of the slice-shaped products is determined by a floor area of the U-shaped forming channel and the upper forming surface, wherein at least one forming plate that is disposed downstream of the forming nozzle is displaced transversally to the conveying direction during extrusion with at least one positioning element in at least one component, wherein a control unit controls the positioning element synchronously with an extrusion velocity, the at least one forming plate variably forming a longitudinal contour of the slice-shaped products during extrusion, wherein the at least one forming plate forms a product side that is positioned transversally in relation to the thickness of the slice-shaped products determined by the nozzle opening, and wherein the thickness of the slice-shaped products remains unaffected by the at least one forming plate.

10. The method according to claim 9, wherein the control unit displaces the at least one positioning element as a function of a conveying movement of the at least one string-shaped foodstuff.

11. The method according to claim 9, wherein the control unit variably controls a conveying velocity of a conveyor system in order to convey the at least one string-shaped foodstuff with a variable conveying movement through the forming nozzle.

12. The method according to claim 9, wherein two or more forming plates are displaced transversally to the conveying direction during extrusion with two or more respective positioning elements, wherein the positioning elements are activated separately with the control unit in order to form respectively different longitudinal contours of the slice-shaped products variably.

13. The method according to claim 9, wherein the forming nozzle forms at least two string-shaped foodstuffs in parallel lanes, and wherein the at least one forming plate forms longitudinal contours of the slice-shaped products with forming edges that correspond to said parallel lanes.

14. The method according to claim 9, wherein two forming plates are displaced with one or multiple positioning elements correspondingly or independently of one another and in a way as to counteract with one another variably forming longitudinal contours of the slice-shaped products, which are located opposite to one another, with two forming edges.

15. The method according to claim 9, wherein the at least one positioning element comprises a position sensor that is connected to the control unit, and wherein a setting position of the at least one forming plate is recorded and controlled with the position sensor.

16. The method according to claim 9, wherein at least one of the U-shaped forming channel and the upper forming surface is adjusted in order to set the thickness of the slice-shaped products.

17. The method according to claim 9, wherein a floor surface of the U-shaped forming channel and the upper forming surface are parallel surfaces, wherein the floor surface of the U-shaped forming channel and the U-shaped cross section are planar.

* * * * *